3,655,777
HYDROGENATION OF UNSATURATED ALDEHYDES TO UNSATURATED ALCOHOLS

Paul N. Rylander and Duane R. Steele, Newark, N.J., assignors to Engelhard Minerals & Chemicals Corporation, Newark, N.J.
No Drawing. Filed Nov. 12, 1968, Ser. No. 775,156
Int. Cl. C07c *33/00, 33/06;* C11b *9/00*
U.S. Cl. 260—618 H   3 Claims

ABSTRACT OF THE DISCLOSURE

Alpha,beta-olefinically unsaturated aldehydes are hydrogenated to the corresponding unsaturated alcohols using osmium as tht catalyst.

---

This invention relates to a process for preparing unsaturated alcohols, and more particularly to a process for the hydrogenation of alpha,beta-olefinically unsaturated aldehydes to produce the corresponding unsaturated alcohols.

In the past the selective catalytic hydrogenation of unsaturated aldehydes to the unsaturated alcohols has been a difficult problem. Hydrogenation of the alpha,beta-unsaturated aldehydes in the presence of many catalysts, e.g. palladium, platinum, rhodium, ruthenium, and nickel usually proceeds with the reduction of the double bond preferred over the reduction of the carbonyl group.

In accordance with the present invention a method is provided for producing alpha,beta-olefinically unsaturated alcohols from the corresponding unsaturated aldehydes. The process involves contacting an alpha,beta-olefinically unsaturated aldehyde in the presence of hydrogen with an osmium catalyst. As a result of such contacting with the osmium catalyst, surprisingly the carbonyl group is hydrogenated preferentially to the olefinic bond and the reaction stops spontaneously after the reaction with roughly one molecular equivalent of hydrogen, producing the corresponding alcohol in high yield. The product unsaturated alcohol is recovered from the product mass.

As hereinbefore indicated, the hydrogenation catalyst for this selective reaction is osmium. The osmium may be unsupported or supported on a carrier. Preferably supported catalysts are used. Suitable carriers are carbon, alumina, kieselguhr, asbestos barium carbonate, silica and preferably carbon or alumina. The osmium content of the supported catalyst ranges from 0.5 to 30%, preferably 5 to 10% by weight, based on the weight of the support plus osmium. The osmium catalyst may be prepared by any one of a variety of known processes for preparing such catalysts. The hydrogenation is preferably conducted in the presence of a diluent. Lower alkanols such as methanol, isopropanol are preferred. However, the reaction also proceeds in the absence of a diluent.

The hydrogenation is carried out at room temperature to about 200° C. and 50 to 5000 p.s.i.g. Generally at higher pressures lower temperatures are used. Preferred temperatures and pressures are 25 to 100° C. and 750 to 1000 p.s.i.g. The hydrogenation is carried out either batchwise or in a continuous operation.

In the process hydrogen gas is passed into the aldehyde-catalyst zone in at least the stoichiometric quantity to react with the unsaturated aldehyde to reduce the carbonyl bond and produce the unsaturated alcohol.

The hydrogenation of this invention is illustrated with respect to cinnamaldehyde, crotonaldehyde, and acrolein, respectively, by the following equations:

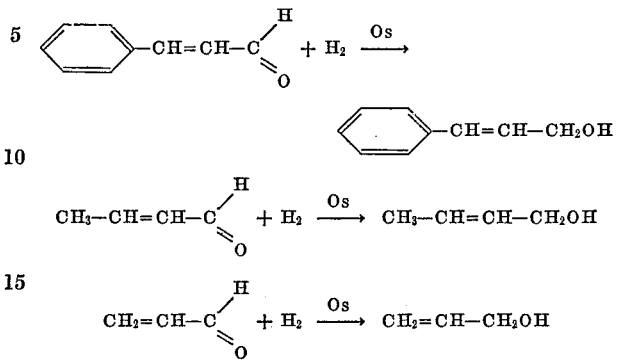

The unsaturated alcohol is recovered from the reaction mass by separating the catalyst from the liquid, for instance by filtration, and separating the diluent by evaporation. The unsaturated alcohol is purified by distillation.

The alpha,beta-olefinically unsaturated aldehydes hydrogenated in accordance with this invention have a structure that can be represented by the general formula:

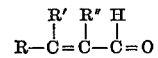

wherein R, R' and R" represent hydrogen atoms or alkyl, aryl, alkaryl, aralkyl or alkoxy radicals, and can be the same or different. Exemplary of the various radicals are a 1–12 or more carbon alkyl; phenyl, naphthyl, ethylphenyl, propylphenyl; benzyl, phenethyl or phenpropyl; and methoxy and propoxy. Functional groups such as hydroxy, carboxy, amido and ester groups can also be present in the aldehyde molecule without interfering with the hydrogenation to produce the saturated alcohol. Alpha,beta-olefinically unsaturated aldehydes included within the general formula above stated are, for example, crotonaldehyde, acrylic aldehyde, cinnamaldehyde, tiglic aldehyde, β-methyl-croton-aldehyde, 2-methyl-2-pentenal, 2-hexenal, 2-ethyl-2-hexenal, 2-phenyl-2-pentenal, α-, β- and γ-phenyl-crotonaldehyde, α-, β- and γ-benzylcrotonaldehyde, α-, β- and γ-p-tolylcrotonaldehyde, and α-, β- and γ-methoxy-crotonaldehyde.

The unsaturated alcohols produced by this invention have use in the production of plastics, and perfumes. Crotonyl alcohol, for example has utility for the production of copolymers with vinyl acetate or styrene, and also as an intermediate for synthesis of other organic compounds. Cinnamyl alcohol is useful in the perfume industry for its high fixation values in perfume compositions containing hyacinth, jasmine, lilac, etc. Another major use is in the production of esters which are also valuable as fixatives for use in perfume compositions.

The following example is given to illustrate the selective hydrogenation process of this invention and is not intended to limit its scope.

EXAMPLE

Hydrogenations were conducted by charging a glass reaction vessel containing a stirring bar with one to two grams of osmium catalyst supported on various carriers, 10 grams of unsaturated aldehyde substrate and, when a diluent was used, 25 ml. of the diluent. The vessel was placed in a stirred autoclave, flushed with hydrogen and, finally pressured and heated. The reaction stopped spontaneously after the absorption of one mole equivalent of hydrogen. After hydrogenation ceased, the catalyst was separated from the reaction mixture by filtration and the filtrate was analyzed chromatographically. Cinnamaldehyde, crotonaldehyde, and acrolein were used as representative substrates. The catalysts used were osmium supported on carbon and osmium supported on activated alumina. The results show that the unsaturated aldehyde was obtained in high yield.

The surprising selectivity of osmium for hydrogenation of the carbonyl group of alpha, beta-unsaturated aldehydes will be appreciated by reference to the literature, e.g. see Engelhard Industries Tech. Bull., vol. 4 (1963) at pages 49–51. This article discusses the difficulty of reducing the unsaturated aldehydes to the unsaturated alcohols. The literature shows, for example, that crotonaldehyde dissolved in methanol is selectively reduced to 100% butyraldehyde under mild conditions.

2. A process for the production of an olefinically unsaturated alcohol which comprises contacting an alpha, beta-olefinically unsaturated aldehyde having the formula:

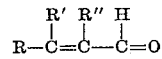

where R, R' and R" represent hydrogen or a 1–12 carbon radical which is alkyl, aryl, alkaryl, aralkyl or alkoxy at a temperature in the range of room temperature to about 200° C. and at a pressure of about 50 to 5000 p.s.i.g. with hydrogen in the presence of a catalyst consisting essentially of osmium supported on alumina and containing 0.5 to 30% by weight osmium, permitting the reaction to proceed until about one molecular equivalent of hydrogen is absorbed and recovering the corresponding unsaturated alcohol.

3. A process of claim 1 wherein the unsaturated aldehyde is dispersed in a lower alkanol.

TABLE

| Catalyst | Catalyst weight, mg. | Substrate | Diluent | Pressure, p.s.i.g. | Temperature, °C. | Results (percent yield) |
|---|---|---|---|---|---|---|
| 5%: |  |  |  |  |  |  |
| Os/C | 1,150 | Cinnamaldehyde | Isopropanol | 1,000 | 102 | 95% cinnamyl alcohol. |
| Os/C | 1,150 | do | Ethanol | 1,000 | 100 | Do. |
| Os/Al₂O₃ | 1,200 | do | Isopropanol | 1,000 | 100 | 90% cinnamyl alcohol. |
| Os/C | 1,000 | Crotonaldehyde | do | 950 | 100 | 83% crotyl alcohol. |
| Os/Al₂O₃ | 1,800 | do | None | 1,100 | 180 | 56% crotyl alcohol. |
| Os/Al₂O₃ | 1,500 | do | Isopropanol | 930 | 101 | 68% crotyl alcohol. |
| Os/Al₂O₃ | 1,500 | Acrolein | do | 1,000 | 100 | 73% allyl alcohol. |

What is claimed is:
1. A process for the production of an olefinically unsaturated alcohol which comprises contacting an alpha, beta-olefinically unsaturated aldehyde having the formula:

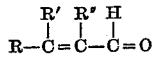

where R, R' and R" represent hydrogen or a 1–12 carbon radical which is alkyl, aryl, alkaryl, aralkyl or alkoxy at a temperature in the range of room temperature to about 200° C. and at a pressure of about 50 to 5000 p.s.i.g. with hydrogen in the presence of a catalyst consisting essentially of osmium supported on carbon and containing 0.5 to 30% by weight osmium, permitting the reaction to proceed until about one molecular equivalent of hydrogen is absorbed and recovering the corresponding unsaturated alcohol.

References Cited

UNITED STATES PATENTS

| 2,407,813 | 9/1946 | Cheney | 252—447 |
| 2,614,107 | 10/1952 | Wender et al. | 260—638 B |
| 2,763,696 | 9/1956 | Finch et al. | 260—638 B |
| 3,121,758 | 2/1964 | Rylander et al. | 260—682 |
| 3,284,517 | 11/1966 | Rylander et al. | 260—638 B |
| 3,454,644 | 7/1969 | Dewhirst et al. | 260—638 B |
| 3,514,493 | 5/1970 | Pregaglia et al. | 260—642 |
| 3,515,679 | 6/1970 | Gaeth et al. | 252—447 |

FOREIGN PATENTS

| 1,123,837 | 8/1968 | Great Britain | 260—638 B |

BERNARD HELFIN, Primary Examiner

J. E. EVANS, Assistant Examiner

U.S. Cl. X.R.

252—447, 466 PT; 260—615 R, 638 B